US012685242B2

(12) United States Patent
Martin

(10) Patent No.: US 12,685,242 B2
(45) Date of Patent: Jul. 21, 2026

(54) GREASELESS GAUGE WHEEL ARM ASSEMBLY

(71) Applicant: DEERE & COMPANY, Moline, IL (US)

(72) Inventor: Robert W. Martin, Davenport, IA (US)

(73) Assignee: Deere & Company, Moline, IL (US)

( * ) Notice: Subject to any disclaimer, the term of this patent is extended or adjusted under 35 U.S.C. 154(b) by 896 days.

(21) Appl. No.: 17/898,744

(22) Filed: Aug. 30, 2022

(65) Prior Publication Data

US 2024/0065133 A1 Feb. 29, 2024

(51) Int. Cl.
A01B 71/04 (2006.01)
A01B 63/16 (2006.01)

(52) U.S. Cl.
CPC ............ A01B 71/04 (2013.01); A01B 63/163 (2013.01)

(58) Field of Classification Search
CPC ... A01B 63/163; A01B 63/006; A01B 63/026; A01B 71/04; A01B 35/28; A01C 5/068; A01C 5/064; A01C 7/201
See application file for complete search history.

(56) References Cited

U.S. PATENT DOCUMENTS 5,427,038 A * 6/1995 Ege ......................... A01C 5/064
111/164
5,904,107 A * 5/1999 Kester ...................... A01C 5/06
111/135

| 6,082,721 | A | * | 7/2000 | Kingsley | F16C 23/04 |
| | | | | | 411/359 |
| 6,321,667 | B1 | * | 11/2001 | Shoup | A01C 5/068 |
| | | | | | 111/164 |
| 8,387,715 | B2 | * | 3/2013 | Rylander | A01B 63/163 |
| | | | | | 111/163 |
| 10,154,621 | B2 | * | 12/2018 | Schoolman | A01C 5/064 |
| 10,172,272 | B2 | * | 1/2019 | Kester | A01B 35/16 |
| 10,299,427 | B2 | * | 5/2019 | Sivinski | A01B 71/04 |
| 10,765,055 | B2 | * | 9/2020 | Sivinski | A01C 5/064 |
| 10,798,864 | B2 | * | 10/2020 | Salowitz | A01B 63/006 |
| 11,357,161 | B2 | * | 6/2022 | Sivinski | A01C 7/203 |
| 2003/0209175 | A1 | * | 11/2003 | Kester | A01C 7/201 |
| | | | | | 111/52 |
| 2005/0072344 | A1 | * | 4/2005 | Kester | A01C 5/066 |
| | | | | | 111/135 |

(Continued)

OTHER PUBLICATIONS

Extended European Search Report and Written Opinion issued in European Patent Application No. 23181240.5, dated Jan. 29, 2024, in 09 pages.

*Primary Examiner* — Jamie L Mcgowan
(74) *Attorney, Agent, or Firm* — Taft Stettinius & Hollister LLP; Stephen F. Rost

(57) ABSTRACT

A pivot arm assembly for an agricultural machine. The pivot arm assembly has a pivot arm having a bushing block on a first end and configured to be coupled to a gauge wheel on a second end, a lateral positioning member configured to be selectively coupled to the bushing block to provide lateral adjustment of the pivot arm, a through bolt configured to selectively couple the lateral positioning member to a frame, and a friction reducing member positioned between the bushing block and the through bolt. The friction reducing member allows pivotal movement of the pivot arm relative to the through bolt and does not require a routine application of grease.

15 Claims, 11 Drawing Sheets

(56)         References Cited

U.S. PATENT DOCUMENTS

| 2007/0074879 | A1* | 4/2007 | Frasier | .................. | A01B 71/04 |
| | | | | | 172/604 |
| 2011/0162565 | A1* | 7/2011 | Rylander | .............. | A01C 5/068 |
| | | | | | 111/200 |
| 2014/0352991 | A1* | 12/2014 | Patwardhan | .......... | A01C 5/066 |
| | | | | | 172/773 |
| 2017/0156254 | A1* | 6/2017 | Kester | ................... | A01C 5/068 |
| 2017/0202130 | A1* | 7/2017 | Schoolman | ........... | A01B 71/04 |
| 2018/0228076 | A1* | 8/2018 | Sivinski | .............. | A01B 63/163 |
| 2020/0178457 | A1* | 6/2020 | Sivinski | ................ | A01C 5/064 |

* cited by examiner

GREASELESS GAUGE WHEEL ARM ASSEMBLY

FIELD OF THE DISCLOSURE

The present disclosure relates to a gauge wheel assembly, and more particularly to a gauge wheel assembly that does not require a routine application of grease.

BACKGROUND OF THE DISCLOSURE

A typical structure for an agricultural planter row unit includes a frame to which a furrow opener is mounted. A depth control member, such as a gauge wheel, is positioned adjacent the furrow opener to limit the depth to which the opener penetrates into the soil. The gauge wheel is mounted to an arm that is pivotally mounted to the frame. The gauge wheel and pivot arm are laterally adjustable relative to the frame so that the gauge wheel can be placed close to, or in light contact with, the opener disks. This enables the gauge wheel to prevent moist soil from sticking to the opener.

SUMMARY

One embodiment is a pivot arm assembly for an agricultural machine. The pivot arm assembly has a pivot arm having a bushing block on a first end and configured to be coupled to a gauge wheel on a second end, a lateral positioning member configured to be selectively coupled to the bushing block to provide lateral adjustment of the pivot arm, a through bolt configured to selectively couple the lateral positioning member to a frame, and a friction reducing member positioned between the bushing block and the through bolt. The friction reducing member allows pivotal movement of the pivot arm relative to the through bolt and does not require a routine application of grease.

In one example of this embodiment, the friction reducing member is a bushing positioned between a radially inner surface of the bushing block and a radially outer surface of the lateral positioning member. In another example, the friction reducing member is a first bushing and a second bushing each positioned between a radially inner surface of the bushing block and a radially outer surface of the lateral positioning member. Part of this example may have a threaded section wherein the bushing block is threadably coupled to the lateral positioning member to provide lateral displacement of the pivot arm, wherein the first bushing is positioned on a first side of the threaded section and the second bushing is positioned on a second side of the threaded section. In one aspect of this part, at least one seal is positioned between the bushing block and the lateral positioning member to prevent debris from contacting the first or second bushing.

In another example of this embodiment the lateral positioning member is a bearing carrier threadably coupled to the bushing block, wherein rotation of the bearing carrier relative to the bushing block provides for lateral adjustment of the pivot arm. In part of this example, the friction reducing member is a bearing assembly positioned radially between the bearing carrier and the through bolt. Further, a snap ring may selectively fix the position of the bearing assembly within the bearing carrier.

In another part of this example, the bearing carrier defines a coupler receiver at a first end, wherein the coupler receiver extends past the bushing block and is configured to provide a location for a coupling tool to selectively rotate the bearing carrier relative to the bushing block.

In yet another part of this example, the bushing block comprises a longitudinal gap and a clamping component wherein the clamping component selectively applies a clamping force to the bearing carrier through the bushing block to substantially prevent the bearing carrier from threadably moving relative to the bushing block when the clamping component applies the clamping force.

In another part of this example, the bearing carrier comprises an exposed threaded section configured to extend outside of the bushing block, wherein a jam nut is threadably coupleable to the exposed threaded section to selectively prevent the bearing carrier from moving relative to the bushing block.

Another embodiment of this disclosure is a method of manufacturing a laterally movable pivot arm assembly. The method includes positioning a lateral positioning member within a bushing block of a pivot arm, the lateral positioning member being laterally repositionable relative to the bushing block, coupling a friction reducing member to the lateral positioning member, the friction reducing member configured to allow the pivot arm to pivot about a through bolt, adjusting the lateral positioning member so the pivot arm is positioned to align a gauge wheel with a cutting disk, locking a lateral position of the lateral positioning member relative to the bushing block, and coupling the lateral positioning member and friction reducing member to a frame of an agricultural machine with the through bolt.

In one example of this embodiment, the friction reducing member comprises a bushing and the bushing is positioned between a radially inner surface of the bushing block and a radially outer surface of the lateral positioning member.

In another example of this embodiment, the friction reducing member includes a first bushing and a second bushing positioned between a radially inner surface of the bushing block and a radially outer surface of the lateral positioning member and the bushing block is threadably coupled to the lateral positioning member at a threaded section. The coupling the friction reducing member step comprises coupling the first bushing between the bushing block and the lateral positioning member on a first side of the threaded section and coupling the second bushing between the bushing block and the lateral positioning member on a second side, the second side being opposite the threaded section relative to the first side.

In yet another example, the locking the lateral positioning member includes providing sufficient torque to the through bolt to create a clamp load between the lateral positioning member and the frame to substantially prevent rotation of the lateral positioning member relative to the frame.

In another example of this embodiment, the lateral positioning member is a bearing carrier and the bearing carrier is threadably coupled to the bushing block, wherein the adjusting the lateral positioning member step includes rotating the bearing carrier relative to the bushing block.

In yet another example, the friction reducing member includes a bearing assembly and the bearing assembly is positioned between the bearing carrier and the through bolt.

In another example, the locking the lateral position of the lateral positioning member step includes engaging a clamping component to selectively restrict the bearing carrier from rotating relative to the bushing block. In part of this example, the clamping component selectively alters a longitudinal gap defined in the bushing block to restrict bearing carrier from rotating.

In yet another example of this embodiment, the locking the lateral position of the lateral positioning member step comprises threading a jam nut on a portion of the bearing carrier to selectively restrict the bearing carrier from rotating relative to the bushing block.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 3b is an exploded view of the pivot arm assembly of FIG. 3a;

FIG. 3c is a detailed perspective view of a bushing assembly of FIG. 3a;

FIG. 4b is an exploded view of the pivot arm assembly of FIG. 4a;

FIG. 4c is a detailed perspective view of a bushing assembly of FIG. 4a;

FIG. 5b is an exploded view of the pivot arm assembly of FIG. 5a; and

FIG. 5c is a detailed perspective view of a bushing assembly of FIG. 5a.

Corresponding reference numerals indicate corresponding parts throughout the several views.

DETAILED DESCRIPTION

The embodiments of the present disclosure described below are not exhaustive and do not limit the disclosure to the precise forms in the following detailed description. Rather, the embodiments are chosen and described so that others skilled in the art may appreciate and understand the principles and practices of the present disclosure.

Figure 1:
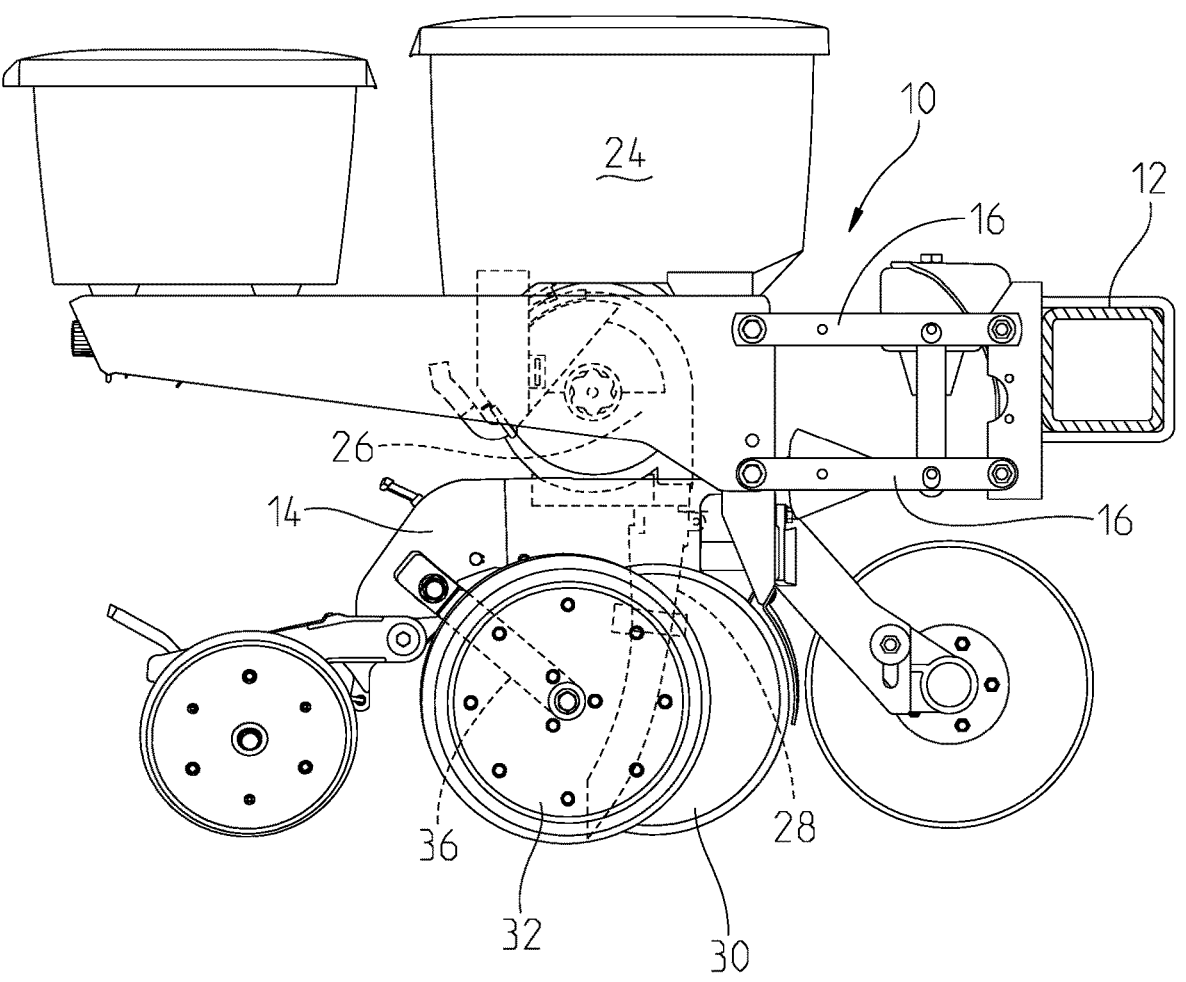
FIG. 1 is a side view of a planter row unit.

FIG. 1 illustrates a planter row unit 10 mounted to transversely extending tool bar 12. The row unit 10 is provided with a central frame member 14 coupled to the tool bar 12 by a parallelogram linkage 16 to enable vertical relative movement between the row unit and the toolbar 12. Seed is stored in seed hopper 24 and provided to a seed meter 26. The seed meter singulates seed from a seed pool and drops the individual seeds through a seed tube 28 into a planting furrow. The furrow is formed in the soil by a disk furrow opener having at least one disk 30. Gauge wheels 32 control the depth of the furrow and are mounted to the frame member 14 by pivot arms 36. There is a gauge wheel adjacent the outer side of the opener disk 30.

Figure 2:
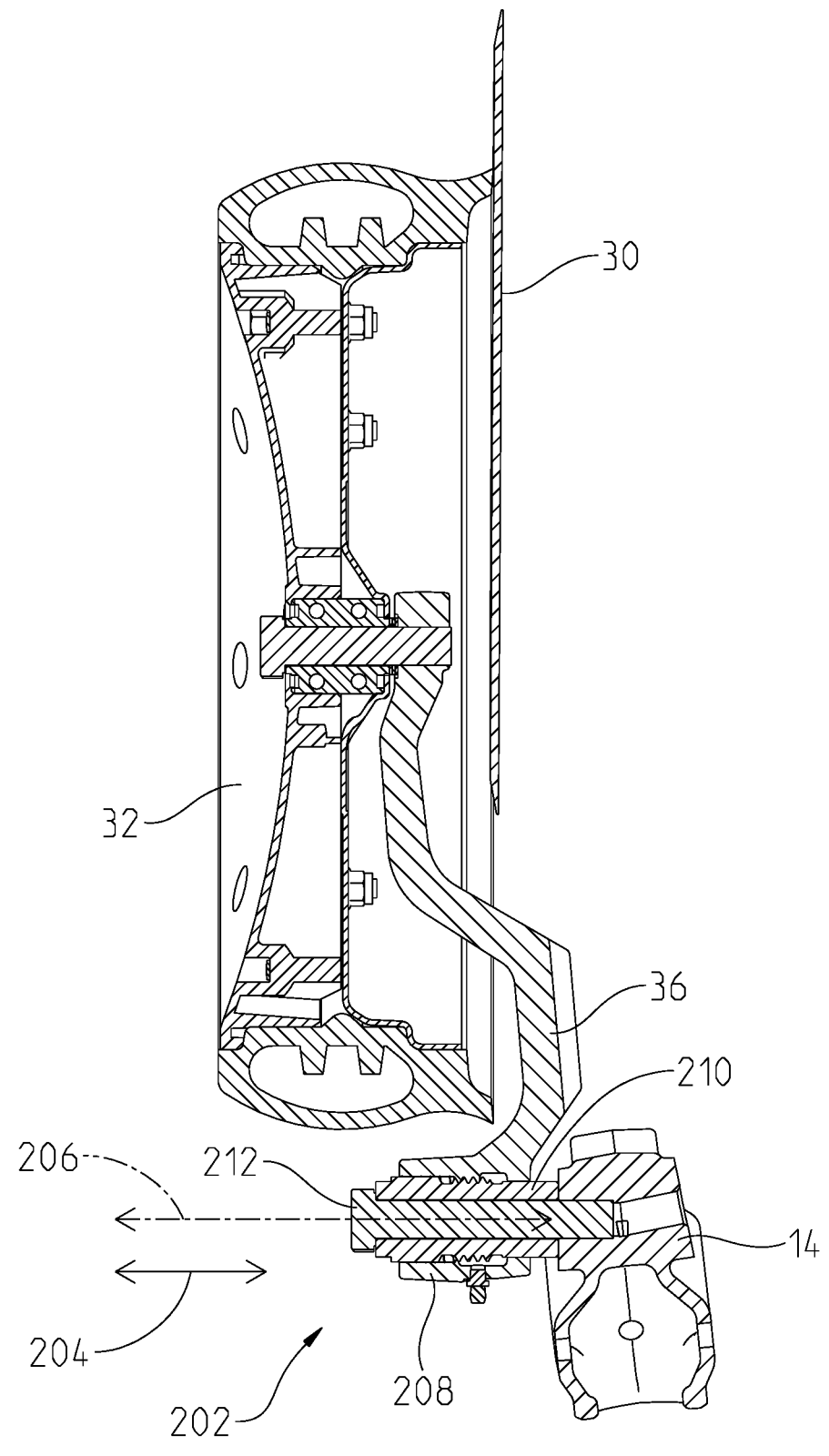
FIG. 2 is a section view of a pivot arm assembly for a gauge wheel.

FIG. 2 illustrates one embodiment of a pivot arm 36 that pivots about a bushing assembly 202 at the end of the arm mounted to the frame member 14. A gauge wheel depth adjustment mechanism acts on the pivot arm 36 to limit upward rotation of the arm, thereby setting the relative position of the gauge wheel 32 and opener disk 30. The pivot arm 36 may pivot to adjust the amount of penetration of the opener disk 30. The pivot arm 36 may also pivot to allow the gauge wheel 32 to move upward during operation when the gauge wheel 32 encounters rocks or other obstacles. The gauge wheel 32 may be adjustable in a lateral direction 204 through axial movement along a bushing axis 206.

The gauge wheel 32 may be adjustable in the lateral direction 204 to be positioned close to, or even lightly touching, the opener disk 30. This allows the gauge wheel 32 to remove moist soil and other debris that tends to adhere to the opener disk 30 and prevents the opener disk 30 from pulling soil upward from the side wall of the seed furrow. Lateral adjustability is needed to compensate for wear of the gauge wheel over time and to allow for variability in the size and shape of the resilient gauge wheel material among other things.

In the embodiment of FIG. 2, the pivot arm 36 has a bushing block 208 sized to receive a bushing 210 therein. The bushing 210 may have a threaded outer surface that threadably engages a threaded inner surface of the bushing block 208. In this configuration, the bushing 210 may be threadably coupled to the bushing block 208 and the threaded engagement of the bushing 210 to the bushing block 208 may be altered to adjust the lateral position 204 of the pivot arm 36 and thereby the gauge wheel 32 relative to the opener disk 30. Once the bushing 210 is threaded into the bushing block 208 such that the lateral position of the pivot arm 36 is at the desired position, a through bolt 212 may be positioned through the bushing 210 and coupled to the frame member 14.

The through bolt 212 may be sufficiently tightened to the frame member 14 to frictionally lock the bushing 210 and prevent rotation of the bushing 210 about the bushing axis 206. However, the pivot arm 36 may still be capable of pivoting about the bushing 210. When the pivot arm 36 pivots about the bushing 210, friction may be generated between the interface of an inner radial surface of the bushing block 208 and the adjacent outer radial surface of the bushing 210.

To minimize this the friction between the bushing block 208 and the bushing 210, grease or other lubricating substances may be introduced through a grease fitting into a space along the threaded interchange between the bushing block 208 and the bushing 210. The grease may be required in the embodiment of FIG. 2 to ensure the pivot arm 36 can properly pivot relative to the bushing 210 without undue friction or wear. The bushing assembly 202 of FIG. 2 may require routine maintenance steps of adding grease to the bushing assembly 202 to ensure the bushing assembly 202 continues to function as intended without undue friction and wear.

Figure 3A:
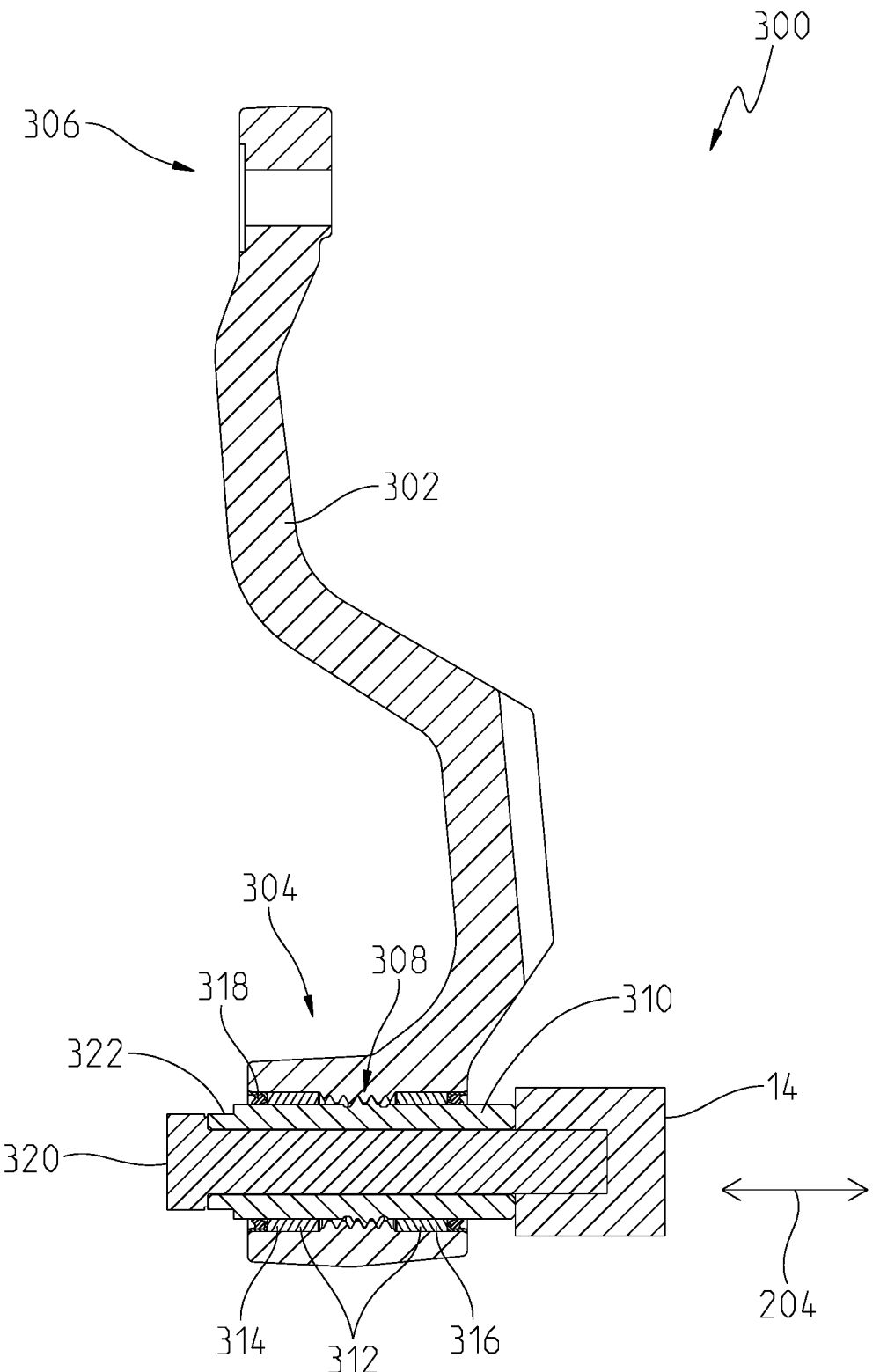
FIG. 3a is a section view of another embodiment of a pivot arm assembly.
Figure 3B:
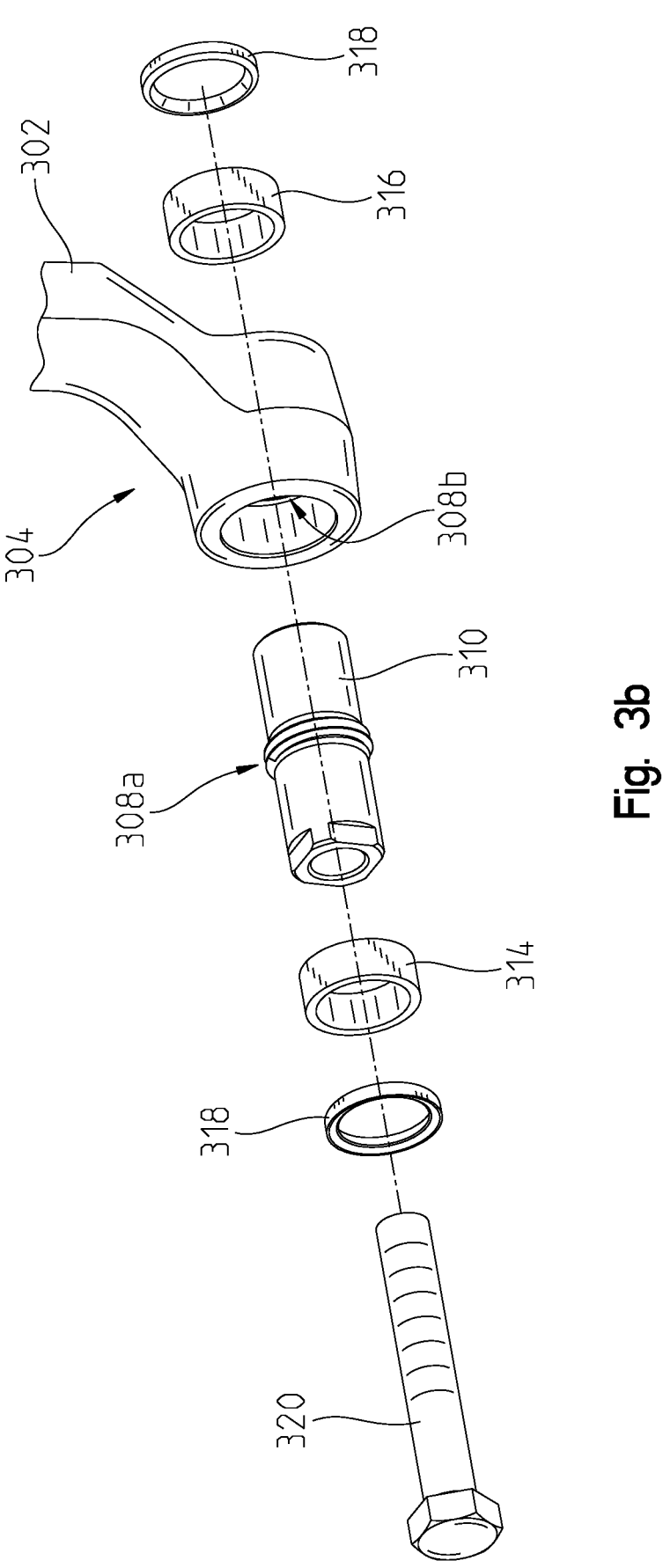
Figure 3C:
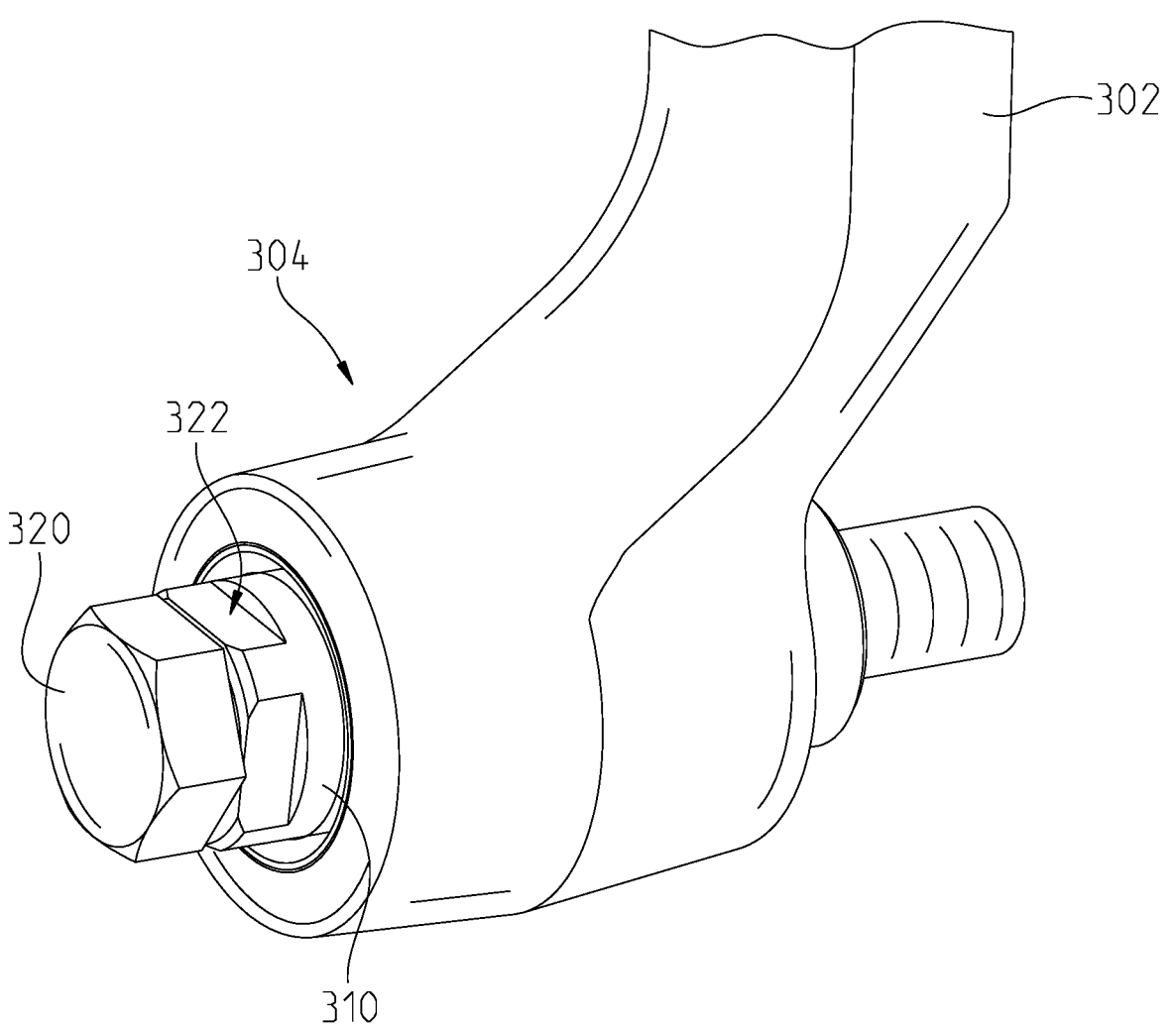

Referring now to FIGS. 3a-3c, one embodiment of an improved pivot arm assembly 300 is illustrated. The pivot arm assembly 300 may have a pivot arm 302 with a first end having a bushing block 304 and a second end 306 configured to be coupled to the gauge wheel 32. The bushing block 304 may have a threaded section 308b along a radially inner surface sized to threadably engage a corresponding threaded section 308a of a lateral positioning member 310. The bushing block 304 may be threadably repositionable relative to the lateral positioning member 310 in the lateral direction 204.

The pivot arm assembly 300 may have a bushing block 304 sized to position one or more friction reducing member 312 between a radially outer surface of the lateral positioning member 310 and the radially inner surface of the bushing block 304. In one aspect of this disclosure, the friction reducing member 312 may be a first and second bushing 314, 316. The first and second bushings 314, 316 may be positioned on either side of the threaded section 308 within the bushing block 304. In this configuration, the friction reducing member 312 is positioned between the lateral positioning member 310 and the bushing block 304 such that friction is minimized during movement of the pivot arm 302 relative to the lateral positioning member 310. Further, the friction reducing member 312 may be formed of a material that substantially reduces friction without requiring routine maintenance. For example, the friction reducing member 312 may be bushings 314, 316 formed from oil impregnated powdered metal, heat treated steel, or a fiber reinforced composite with Teflon or other polymers that resist wear without the addition of grease or other materials. Accordingly, once the friction reducing member 312 is positioned within the bushing block 304, the friction reducing member 312 may be substantially maintenance free for the expected use life of the pivot arm assembly 300.

In one aspect of the pivot arm assembly 300 of FIG. 3, the friction reducing members 321 are held axially and rotationally to the bushing block 304 by an interference fit between the outer diameter of the friction reducing members 312 and corresponding counter bores in the bushing block 304. Further, seals 318 may be coupled to opposing sides of the bushing block 304 to substantially prevent debris and the like from entering the area occupied by the friction reducing member 312. The seals 318 may also be coupled to the bushing block 304 through an interference fit such that they are substantially prevented from pivoting or moving axially relative to the bushing block 304 when the pivot arm 302 pivots relative to the lateral positioning member 310.

To assemble the pivot arm assembly 300, the lateral positioning member 310 may be threadably coupled to the bushing block 304 either before any of the friction reducing members 312 or after one of the bushings 314, 316 is pressed into position within the bushing block 304. In one embodiment, one of the bushings 314, 316 may be pressed into the bushing block 304 and retained therein via a friction fit with the bushing block 304. The corresponding seal 318 may then be pressed into the bushing block 304 and retained therein via friction fit along an exterior side of the adjacent bushing 314, 316. The lateral positioning member 310 may then be threadably coupled to the threaded section 308b of the bushing block 304 and positioned through the corresponding bushing 314, 316 and seal 318 already positioned within the bushing block 304. Once the lateral positioning member 310 is threaded to the bushing block 304, the other of the bushings 314, 316 may be pressed into position such that a bushing 314, 316 is positioned on either side of the threaded section 308. Next, the adjacent seal 318 may be pressed into the bushing block 304 on the exterior side of the bushings 314, 316.

In an alternative method, the lateral positioning member 310 may be threadably coupled to the bushing block without any bushings 314, 316 of the friction reducing member 312 being in place. Once the lateral positioning member 310 is threadably coupled to the bushing block 304, both bushings 314, 316 may be substantially simultaneously pressed into the bushing block 304 on opposite sides of the threaded section 308. Next, the seals 318 may be substantially simultaneously pressed into the bushing block 304 on outer sides of the bushings 314, 316.

In yet another embodiment, the lateral positioning member 310 may be threadably coupled to the threaded section 308 of the bushing block 304 before the friction reducing member 312 is positioned therein. Next, one of the bushings 314, 316 may be pressed into the bushing block 304 between the lateral positioning member 310 and the bushing block 304. Then, a seal 318 may be pressed into the bushing block 304. A bushing 314, 316 and seal 318 may then be pressed into the opposite side of the bushing block 304.

Regardless of how the lateral positioning member 310 and friction reducing member 312 are positioned within the bushing block 304, a through bolt 320 may be positioned through the lateral positioning member 310 and threadably coupled to the frame member 14 or a bracket coupled thereto. Initially, the bolt 320 may be in a loose configuration where the bolt 320 does not provide a substantial load compressing the lateral positioning member 310 against the frame member 14 such that the lateral positioning member 310 may be rotated relative to the frame member 14. In this loose configuration, the lateral positioning member 310 may be rotated to move the pivot arm 302 in a lateral direction 204 as the threaded section 308a of the lateral position member 310 engages the threaded section 308b of the bushing block 304. The lateral positioning member 310 may not move substantially in the lateral direction 204 because a head of the bolt 320 may prevent axial movement in a first direction while contact with the frame member 14 prevents substantial axial movement in a second direction. Accordingly, in the loose configuration, the bolt 320 may not substantially compress the lateral positioning member 310 against the frame member 14 but still prevent the lateral positioning member 310 from moving substantially away from the frame member 14. In other words, in the loose configuration rotation of the lateral positioning member 310 moves the pivot arm 302 in either lateral direction 204 depending on the rotation direction of the lateral positioning member 310.

In one aspect of this disclosure, the lateral positioning member 310 may have a coupler receiver 322 along a portion distal from the frame member 14. The coupler receiver 322 may extend at least partially out of the bushing block 304 and have a surface that is machined to be engageable by a tool to rotate the lateral positioning member 310. In one example, the coupler receiver 322 has a square-shaped cross-section. In another example, the coupler receiver 322 has a hexagonal cross-section. In yet another example, the coupler receiver 322 has slots defined therein that can be engaged by a corresponding tool.

Once the pivot arm 302 is properly positioned in the lateral direction 204 by rotating the lateral positioning member 310, the through bolt 320 may be further tightened to a secured position. In the secured position, the through bolt 320 may substantially compress the lateral positioning member 310 against the frame member 14 or washers there between to prevent rotation of the lateral positioning member 310 relative to the frame member 14. In the secured position, the lateral position of the pivot arm 302 may be substantially fixed to ensure the corresponding gauge wheel 32 is properly position along the opener disk 30.

While the lateral positioning member 310 illustrated herein has the threaded section 308a positioned between the bushings 314, 316, in an alternate embodiment contemplated herein the threads can be on one end or the other with a single long section of smooth cylindrical surfaces opposite the threaded section for receiving the friction reducing member. In this embodiment there could be one long friction reducing member or two small wear bushings with one seal on each side of the bushing or bushing pair.

Figure 4A:
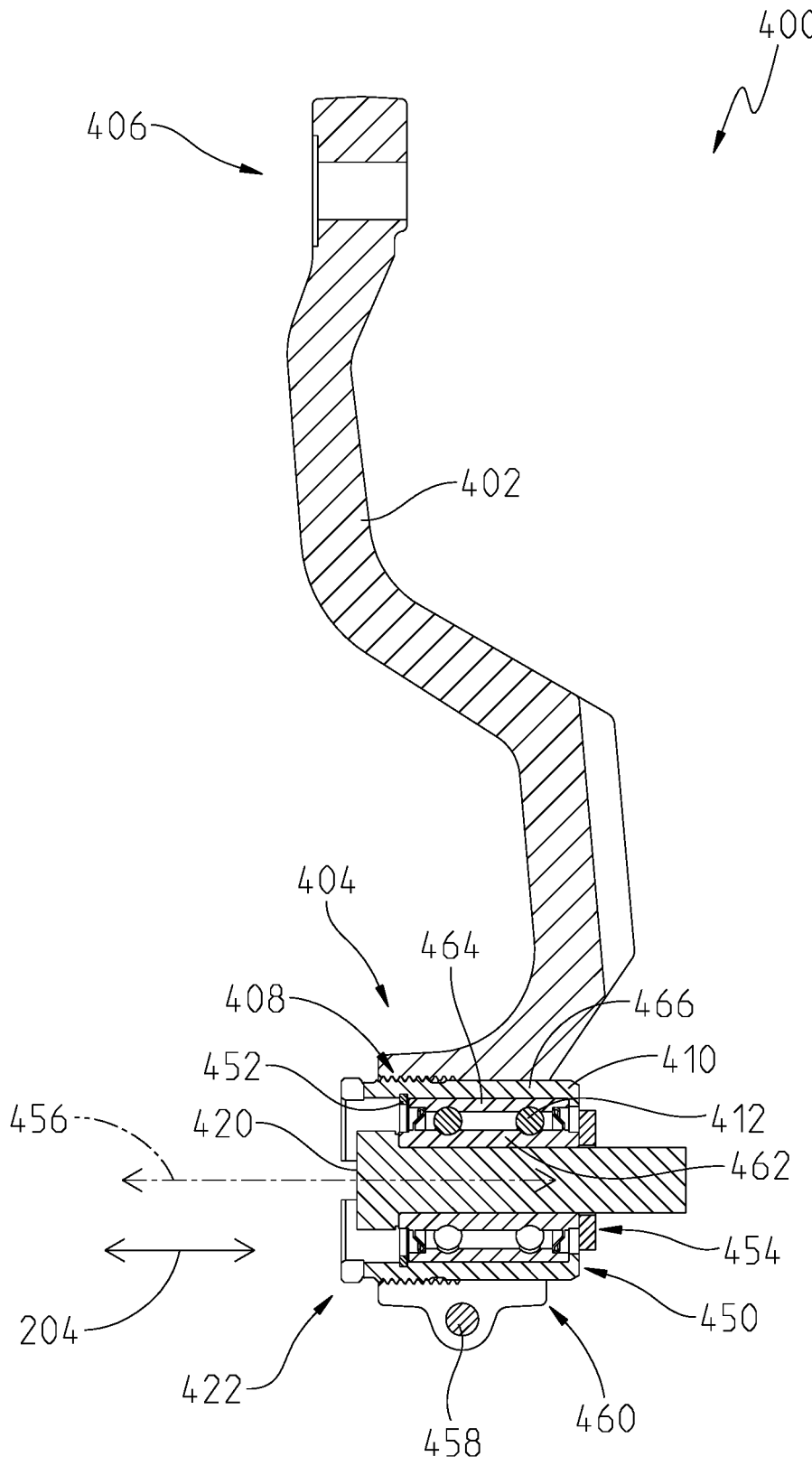
FIG. 4a is a section view of another embodiment of a pivot arm assembly.
Figure 4B:
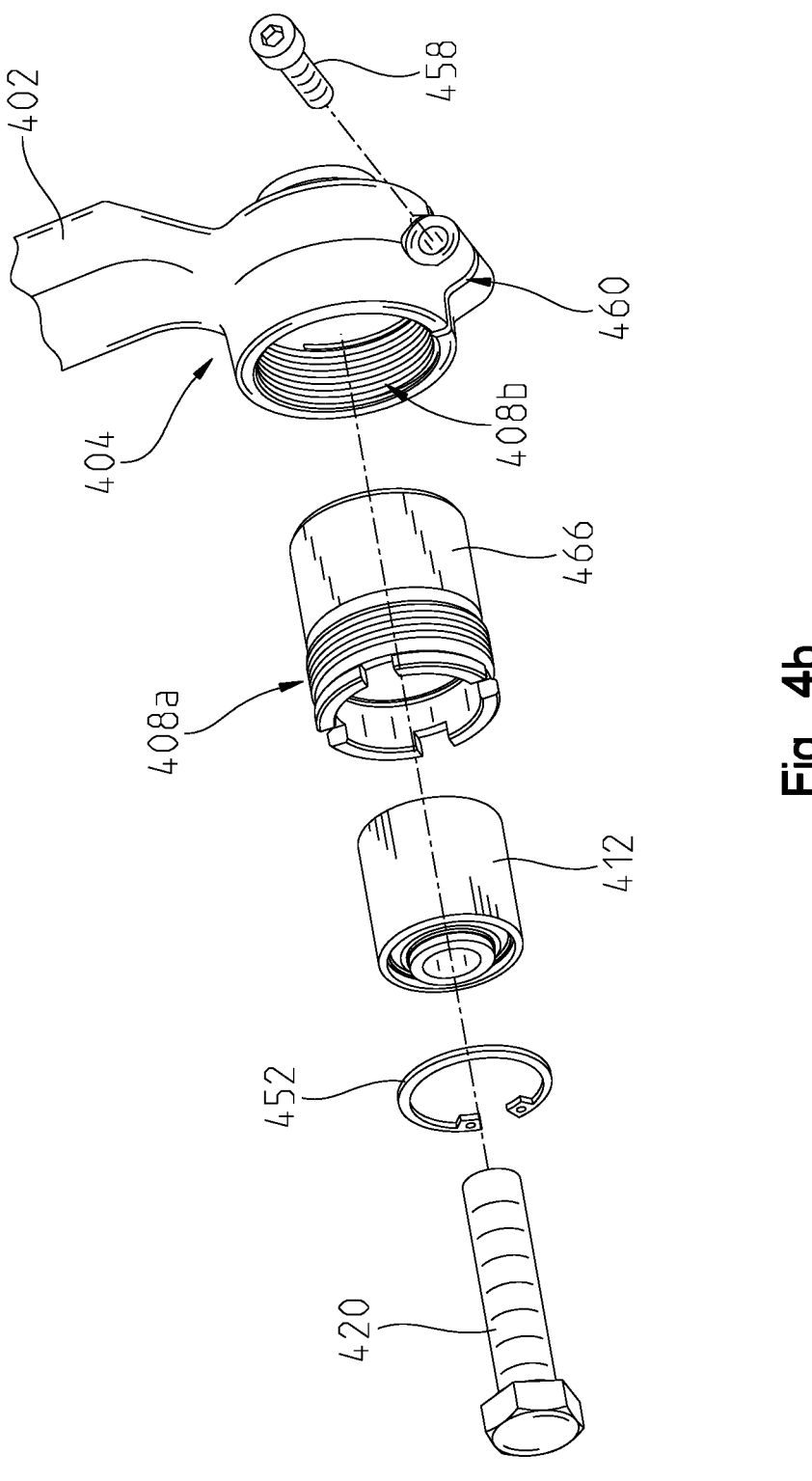
Figure 4C:
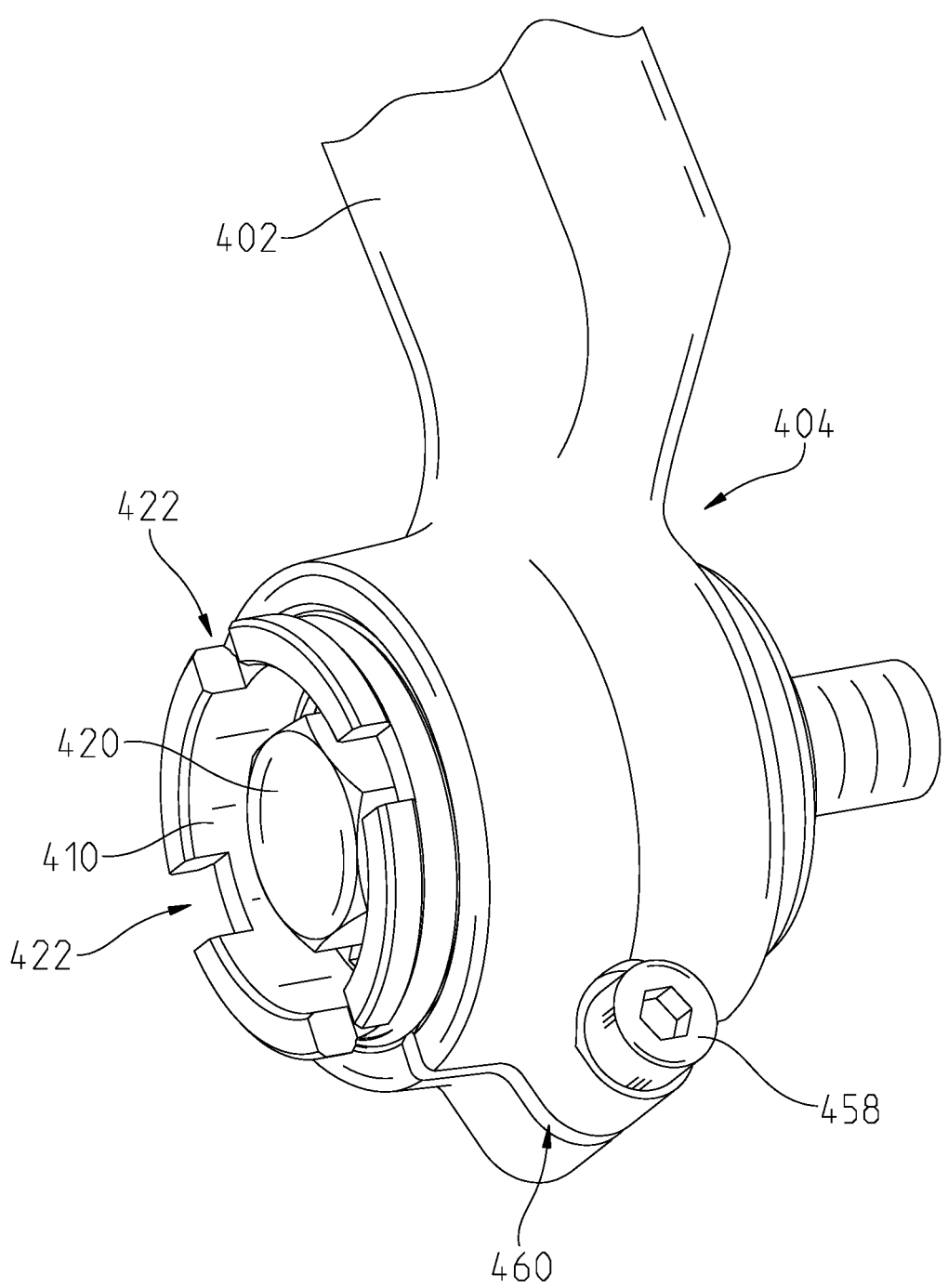

Referring now to FIGS. 4a-4c, another embodiment of a pivot arm assembly 400 is illustrated. The pivot arm assembly 400 may have a pivot arm 402 having a second end configured to be coupled to the gauge wheel 32 and be movable in the lateral direction 204 relative to the frame member 14 to be properly positioned adjacent an opener disk 30. This embodiment of the pivot arm assembly 400 has a lateral positioning member 410 in the form of a bearing carrier 466 having a threaded section 408a threadably coupled to a threaded section 408b of a bushing block 404. The bearing carrier 466 may be positioned at least partially within a through-hole defined in the bushing block 404 and be threadably coupled thereto along the threaded section 408. The bearing carrier 466 may have a frame-side lip 450 that extends radially inward to act as a stop for a friction reducing member 412. One or more spacer 454 may be positioned between the frame member 14 and the bearing carrier 466 to partially space the bearing carrier 466 therefrom.

The bearing carrier 466 may be threadably coupled to the bushing block 404 such that rotation of the bearing carrier 466 relative to the bushing block 404 provides for movement of the pivot arm 402 in the lateral direction 204 depending on the rotation direction of the bearing carrier 466. Accordingly, in one aspect of this disclosure, the pivot arm 402 is adjustable in the lateral direction 204 by rotating the bearing carrier 466 relative to the bushing block 404.

The bearing carrier 466 may be sized to position a friction reducing member 412 therein. The friction reducing member 412 may be a bearing assembly having a radially inner race 462 and a radially outer race 464 along with a plurality of roller balls there between. The bearing assembly may be configured to be a sealed or unsealed bearing assembly that does not require routine application of grease or oil. Accordingly, once the friction reducing member 412 is positioned within the lateral positioning member 410, the friction reducing member 412 may be substantially maintenance free, not requiring routine application of oil, grease, or any other fluid or material for the expected use life of the pivot arm assembly 400.

The bearing carrier 466 may partially define a cylindrical cavity having an inner diameter sized to correspond with the outer diameter of the outer race 464 of the friction reducing member 412. Further, the inner race 462 of the friction reducing member 412 may be sized to allow a through bolt 420 to be positioned there through. Further still, the cylindrical cavity of the bearing carrier 466 may have an annular groove sized to partially receive a snap ring 452 therein. Snap ring 452 may be positioned within the cylindrical cavity of the bearing carrier 466 such that it substantially prevents the outer race 464 of the friction reducing member 412 from sliding out of the bearing carrier 466 once positioned therein with the snap ring 452 in place.

The bearing carrier 466 and friction reducing member 412 may be coupled to one another such that the through bolt 420 may be threadably coupled to the frame member 14 or a bracket thereof to compress the inner race 462 of the friction reducing member 412 against the frame member 14 through the spacer 454 positioned axially between the inner race 462 and the frame member 14. Once the through bolt 420 is properly coupled to the frame member 14, the bearing carrier 466 may be substantially prevented from moving in the lateral direction 204 away from the frame member 14.

However, only the inner race 462 of the friction reducing member 412 is rotationally fixed to the frame member 14. The outer race 464 of the friction reducing member 412 may be free to rotate about an axis 456 via the roller balls. Accordingly, even when the through bolt 420 is properly tightened to the frame member 14, the bearing carrier 466 may rotate about the axis 456 to alter the position of the pivot arm 402 in either lateral direction 204.

To facilitate rotation of the bearing carrier 466, a coupler receiver 422 may be defined on a distal end of the bearing carrier 466 relative to the frame member 14. The coupler receiver 422 may be sized to correspond with a coupling tool to rotate the bearing carrier 466 relative to the pivot arm 402 to adjust the pivot arm 402 in either lateral direction 204. The coupler receiver 422 may extend at least partially out of the bushing block 404 and have a surface that is machined to be engageable by a tool to rotate the bearing carrier 466. In one example, the coupler receiver 422 has a square-shaped cross-section. In another example, the coupler receiver 422 has a hexagonal cross-section. In yet another example, the coupler receiver 422 has slots defined therein that can be engaged by a corresponding tool.

Regardless, once the lateral position of the pivot arm 402 is achieved such that the gauge wheel 32 is properly positioned adjacent to the opener disk 30, a clamping component 458 on the bushing block 404 may be engaged to clamp the bearing carrier 466 within the bushing block 404 to substantially prevent further relative rotation. The clamping component 458 may be a bolt positioned transversely through a longitudinal gap 460 defined in the bushing block 404. The longitudinal gap 460 may be an expandable gap along the bushing block 404 that allows the bushing block 404 to selectively compress the bearing carrier 466 therein when a sufficient torque is applied to the clamping component 458. When the clamping component 458 is released, the bushing block may not substantially compress the bearing carrier 466 therein and the bearing carrier 466 may selectively rotate therein. However, when the clamping component 458 is engaged the longitudinal gap 460 may slightly close, allowing the bushing block 404 to compress against the bearing carrier 466 and substantially prevent relative rotation of the bearing carrier 466 relative to the bushing block 404.

In assembling the pivot arm assembly 400, the friction reducing member 412 may be pressed or otherwise positioned within the cylindrical cavity of the bearing carrier 466 until the outer race 464 is close to the frame-side lip 450 so the snap ring 452 can be positioned at least partially in the annular cavity of the bearing carrier 466. Once the snap ring 452 is coupled to the bearing carrier 466, the friction reducing member 412 is locked between the snap ring 452 and the frame-side lip 450 of the bearing carrier 466. Next, the bearing carrier 466 may be threadably coupled to the threaded section 408b of the bushing block 404 while the clamping component 458 is in an uncompressed configuration. The through bolt 420 may be positioned through the inner race 462 of the friction reducing member 412 so the head of the through bolt 420 contacts a distal end of the inner race 462 or a washer there between. In this configuration, the through bolt 420 may extend partially away from the frame-side lip 450 and the spacer 454 may be positioned thereon. The through bolt 420 may then be threadably coupled to the frame member 14 or a bracket thereof wherein the through bolt 420 compresses the inner race 462 of the friction reducing member 412 between the head of the through bolt 420 on one side and the spacer 454 and frame member 14 on the other. In this configuration, the inner race 462 of the friction reducing member is rotationally locked relative to the frame member 14 while the outer race 464 is free to rotate relative to the inner race 462 and frame member 14. In one embodiment considered herein, a washer may also be positioned between the head of the through bolt 420 and the inner race 462 before the through bolt 420 is coupled to the frame member 14.

With the inner race 462 of the friction reducing member 412 coupled to the frame member 14, a user may use a coupler tool to engage the coupler receiver 422 to rotate the bearing carrier 466 in a first direction or a second direction to thereby move the pivot arm 402 in either lateral direction 204 as the threaded sections 408 of the bushing block 404 and the bearing carrier 466 engage one another. Once the desired lateral position of the pivot arm 402 is achieved, the clamping component 458 may be engaged to provide a clamping force on the bushing block 404 along the longitudinal gap 460 to clamp the bearing carrier 466 to the bushing block 404. In this configuration, the bearing carrier 466 may no longer rotate relative to the pivot arm 402 and the lateral position of the pivot arm 402 is substantially locked in the selected position. Once the lateral position of the pivot arm 402 is locked, the pivot arm 402 may still pivot relative to the through bolt 420 via the friction reducing member 412. However, the lateral position of the pivot arm 402, and the gauge wheel 32 coupled thereto, is substantially fixed to ensure the spacing in the lateral direction 204 between the gauge wheel 32 and the opener disk 30 does not substantially change during use.

In one aspect of the pivot arm assembly 400, the positioning of the pivot arm 402 in the lateral direction 204 may be altered while the through bolt 420 remains in a coupled configuration compressing the inner race 462 of the friction reducing member 412 to the frame member 14. To adjust the pivot arm 402 in either lateral direction 204, the clamping component 458 can be loosened to allow the bearing carrier 466 to rotate relative to the bushing block 404. Rotation of the bearing carrier 466 engages the threaded section 408 between the bearing carrier 466 and the bushing block 404 to threadably progress the pivot arm 402 in either lateral direction 204 depending on the rotation direction of the bearing carrier 466. Once the desired lateral position is achieved, the clamping component 458 may be engaged to provide a clamping load on the bearing carrier 466 with the bushing block 404 to substantially prevent further rotation of the bearing carrier 466 relative to the bushing block 404. This substantially locks the lateral position of the pivot arm 402.

Figure 5A:
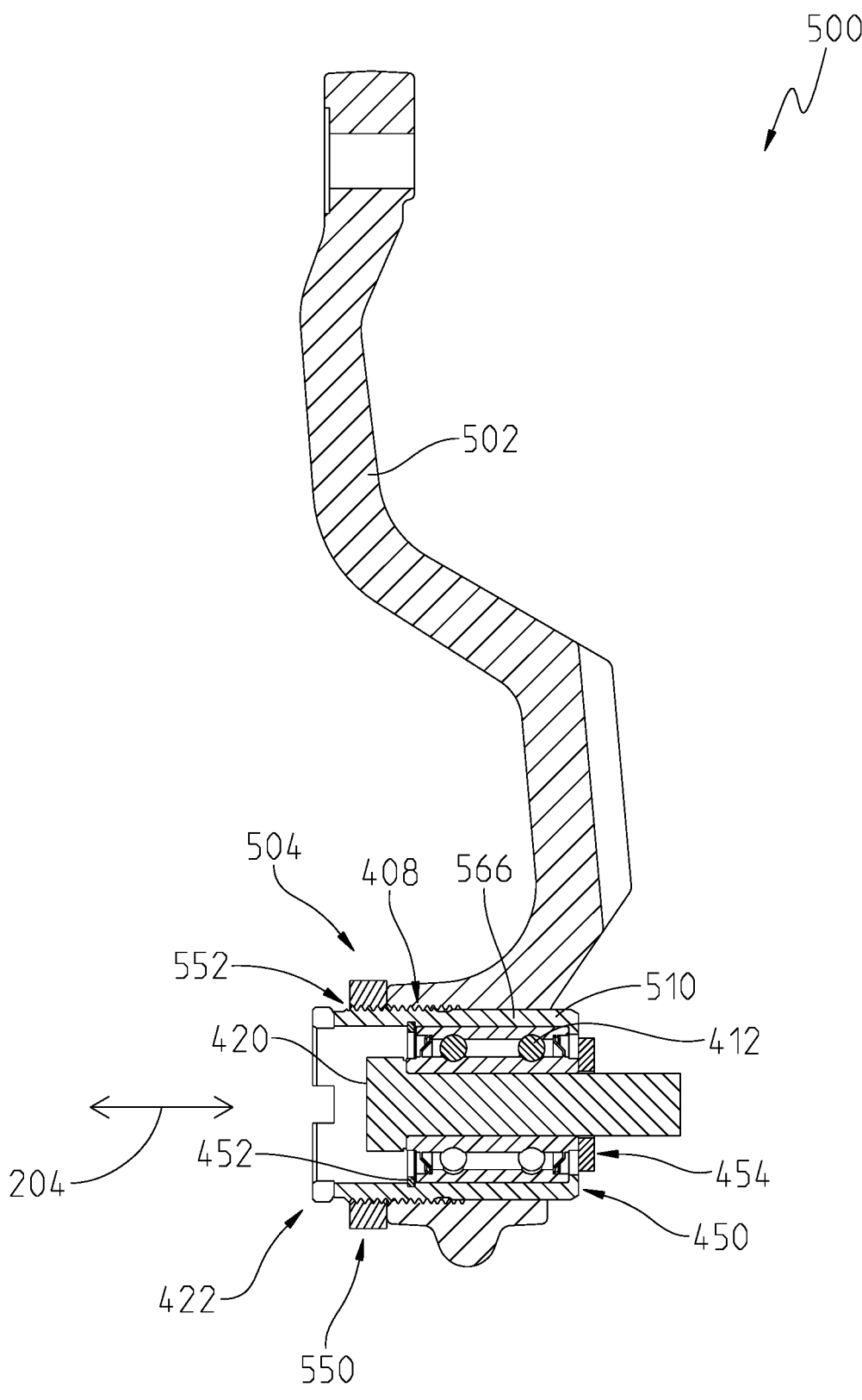
FIG. 5a is a section view of another embodiment of a pivot arm assembly.
Figure 5B:
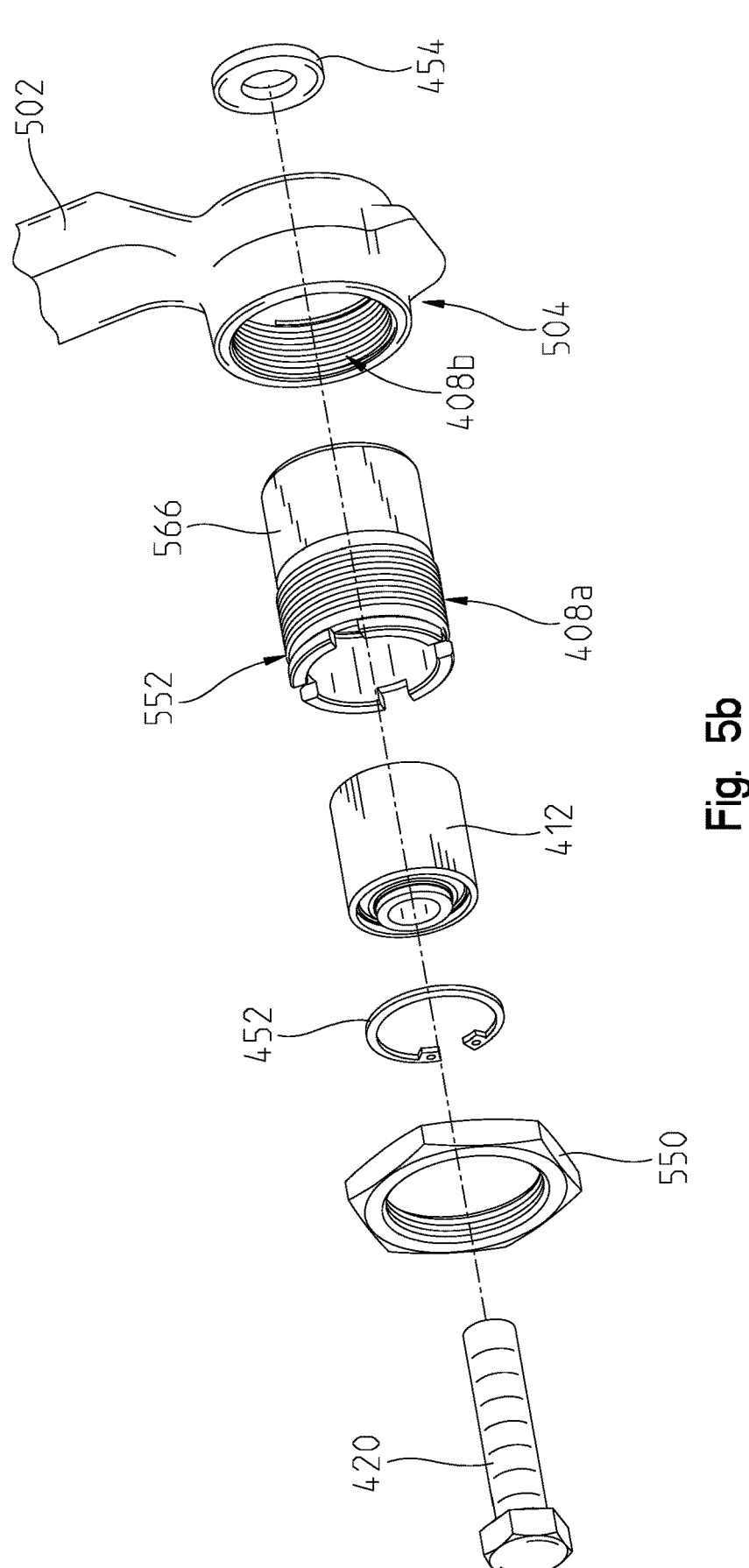
Figure 5C:
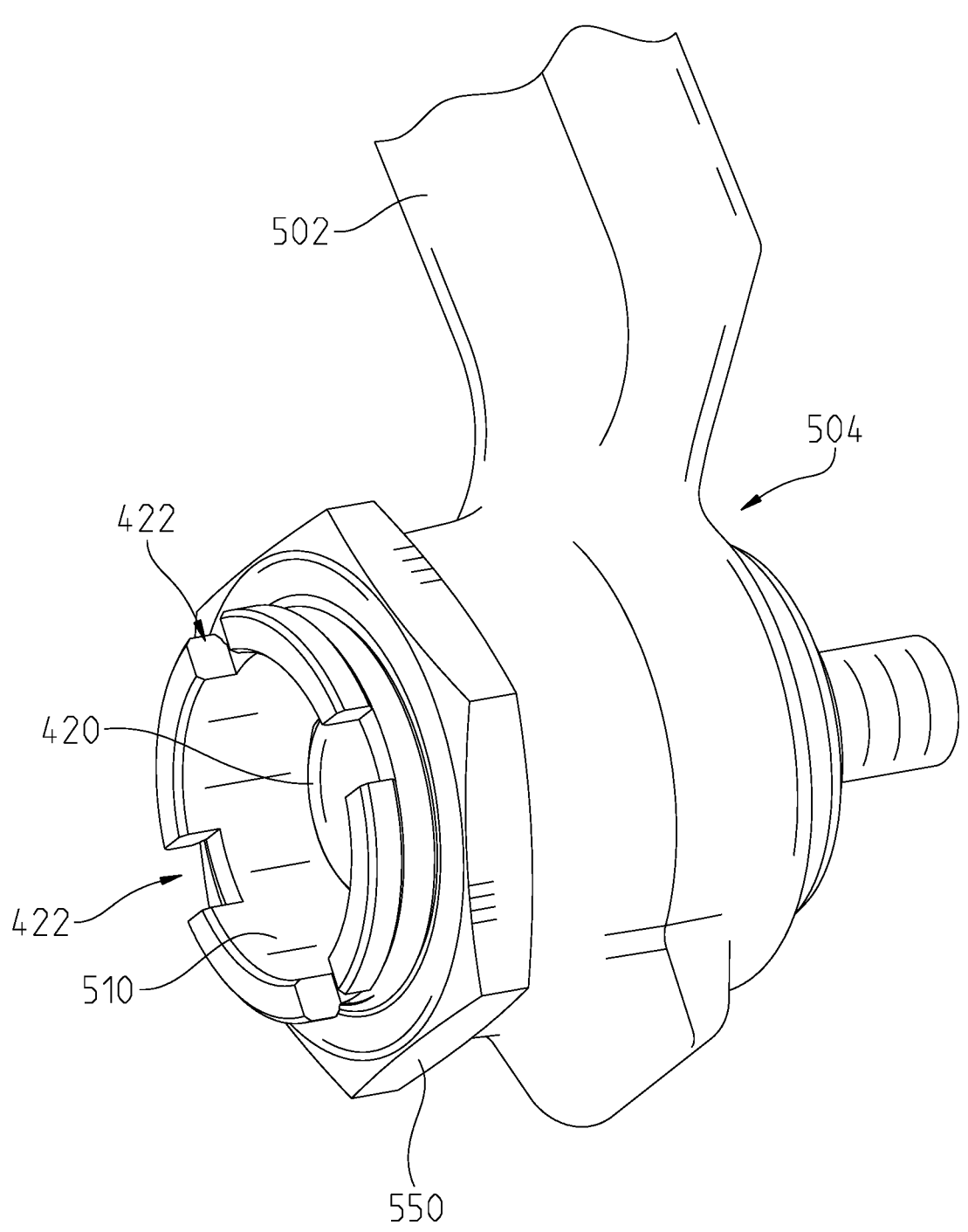

Referring now to FIGS. 5a-5c, another embodiment of a pivot arm assembly 500 is illustrated. In this embodiment, a lateral positioning member 510 may also be in the form of a bearing carrier 566 and may function in substantially the same way discussed herein for the lateral positioning member 410 and bearing carrier 466 except it may be locked from rotating relative to the bushing block 504 with a jam nut 550 rather than using a clamping component 458. Accordingly, the bearing carrier 566 may house the friction reducing member 412 and be threadably coupled to the bushing block 504 in substantially the same way as the bearing carrier 466. Further, the bearing carrier 566 may have a similar coupler receiver 422 configured to be received by a tool to selectively rotate the bearing carrier 566 relative to the bushing block 504. Further still, the bearing carrier 566 may be coupled to the frame member 14 using substantially the same through bolt 420 and corresponding relationship of the through bolt 420 and the friction reducing member 412 as discussed herein for FIGS. 4a-4c.

The bearing carrier 566 only substantially differs from the bearing carrier 466 in the way relative rotation of the bearing carrier 566 and the bushing block 504 is prevented. More specifically, the bearing carrier 566 may have an exposed threaded section 552 that extends distally away from the bushing block 504 when the bearing carrier 566 is positioned therein. The exposed threaded section 552 may be an extension of the threaded section 408a of the bearing carrier 566 or a separate thread pattern. Regardless, the exposed threaded section 552 can be threadably engaged with the jam nut 550 to selectively lock the bearing carrier 566 to the bushing block 504. More specifically, the jam nut 550 may have radially inner surface that has a thread pattern that corresponds with the exposed threaded section 552 of the bearing carrier 566. Once the pivot arm 502 is in the desired lateral position, the jam nut 550 may be threadably coupled to the threaded section 552 of the bearing carrier 566 until it contacts the bushing block 504 or one or more washers there between. The jam nut 550 may be tightened to the exposed threaded section 552 with sufficient torque to press against the bushing block 504 to thereby prevent rotation of the bearing carrier 566 relative to the bushing block 504 and substantially lock the lateral position of the pivot arm 502 relative to the frame member 14.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A pivot arm assembly for an agricultural machine, comprising:
    a pivot arm having a bushing block on a first end and configured to be coupled to a gauge wheel on a second end;
    a lateral positioning member configured to be selectively coupled to the bushing block to provide lateral adjustment of the pivot arm;
    a through bolt configured to selectively couple the lateral positioning member to a frame by selectively compressing the lateral positioning member to the frame; and
    a friction reducing member positioned between the bushing block and the through bolt;
    wherein, the friction reducing member allows pivotal movement of the pivot arm relative to the through bolt without requiring a routine application of grease;
    wherein the lateral positioning member does not move substantially in a lateral direction relative to the through bolt when adjusted to provide lateral adjustment of the pivot arm;
    wherein the through bolt is configured to selectively compress the lateral positioning member to the frame in all secured positions of the lateral positioning member.

2. The pivot arm assembly of claim 1, wherein the friction reducing member comprises a bushing positioned between a radially inner surface of the bushing block and a radially outer surface of the lateral positioning member.

3. The pivot arm assembly of claim 1, wherein the friction reducing member comprises a first bushing and a second bushing each positioned between a radially inner surface of the bushing block and a radially outer surface of the lateral positioning member.

4. The pivot arm assembly of claim 3, further comprising a threaded section wherein the bushing block is threadably coupled to the lateral positioning member to provide lateral displacement of the pivot arm, wherein the first bushing is positioned on a first side of the threaded section and the second bushing is positioned on a second side of the threaded section.

5. The pivot arm assembly of claim 4, further comprising at least one seal positioned between the bushing block and the lateral positioning member to prevent debris from contacting the first or second bushing.

6. The pivot arm assembly of claim 1, wherein the through bolt comprises a head that prevents axial movement of the lateral positioning member.

7. A method of manufacturing a laterally movable pivot arm assembly, comprising:

positioning a lateral positioning member within a bushing block of a pivot arm, the lateral positioning member being laterally repositionable relative to the bushing block;

coupling a friction reducing member to the lateral positioning member, the friction reducing member configured to allow the pivot arm to pivot about a through bolt;

coupling the lateral positioning member and friction reducing member to a frame of an agricultural machine with the through bolt;

adjusting the lateral positioning member so the pivot arm is positioned to align a gauge wheel with an opener disk; and locking a lateral position of the lateral positioning member relative to the bushing block;

wherein the locking the lateral positioning member step comprises providing sufficient torque to the through bolt to create a clamp load between the lateral positioning member and the frame to substantially prevent rotation of the lateral positioning member relative to the frame by tightening the through bolt to the frame;

wherein, the lateral positioning member does not move substantially in a lateral direction relative to the through bolt when adjusting the lateral positioning member;

wherein the through bolt comprises a head that prevents axial movement of the lateral positioning member.

8. The method of claim 7, wherein the friction reducing member comprises a bushing and the bushing is positioned between a radially inner surface of the bushing block and a radially outer surface of the lateral positioning member.

9. The method of claim 7, wherein the friction reducing member comprises a first bushing and a second bushing positioned between a radially inner surface of the bushing block and a radially outer surface of the lateral positioning member and the bushing block is threadably coupled to the lateral positioning member at a threaded section;

wherein the coupling the friction reducing member step comprises coupling the first bushing between the bushing block and the lateral positioning member on a first side of the threaded section and coupling the second bushing between the bushing block and the lateral positioning member on a second side, the second side being opposite the threaded section relative to the first side.

10. The method of claim 7, wherein the through bolt is configured to selectively compress the lateral positioning member to the frame in all secured positions of the lateral positioning member.

11. A pivot arm assembly for an agricultural machine, comprising:

a pivot arm having a bushing block on a first end and configured to be coupled to a gauge wheel on a second end;

a lateral positioning member configured to be selectively coupled to the bushing block to provide lateral adjustment of the pivot arm;

a through bolt configured to selectively couple the lateral positioning member to a frame; and a friction reducing member positioned between the bushing block and the through bolt;

wherein, the friction reducing member allows pivotal movement of the pivot arm relative to the through bolt without requiring a routine application of grease;

wherein the lateral positioning member comprises a bearing carrier threadably coupled to the bushing block, wherein rotation of the bearing carrier relative to the bushing block provides for lateral adjustment of the pivot arm;

wherein the friction reducing member comprises a bearing assembly comprising a plurality of roller balls, the bearing assembly positioned radially between the bearing carrier and the through bolt.

12. The pivot arm assembly of claim 11, further comprising a snap ring selectively fixing an axial position of the bearing assembly within the bearing carrier.

13. The pivot arm assembly of claim 11, wherein the bearing carrier defines a coupler receiver at a first end, wherein the coupler receiver extends past the bushing block and is configured to provide a location for a coupling tool to selectively rotate the bearing carrier relative to the bushing block.

14. The pivot arm assembly of claim 11, wherein the bushing block comprises a longitudinal gap and a clamping component wherein the clamping component selectively applies a clamping force to the bearing carrier through the bushing block to substantially prevent the bearing carrier from moving relative to the bushing block when the clamping component applies the clamping force.

15. The pivot arm assembly of claim 11, wherein the bearing carrier comprises an exposed threaded section configured to extend outside of the bushing block, wherein a jam nut is threadably coupleable to the exposed threaded section to selectively prevent the bearing carrier from moving relative to the bushing block.

* * * * *